US012715197B2

(12) United States Patent
Chang et al.

(10) Patent No.: US 12,715,197 B2
(45) Date of Patent: Aug. 25, 2026

(54) OPTICALLY TRANSPARENT GLASS FREQUENCY ABSORBER

(71) Applicants: CORNING INCORPORATED, Corning, NY (US); POSTECH RESEARCH AND BUSINESS DEVELOPMENT FOUNDATION, Gyeongsangbuk-do (KR)

(72) Inventors: Suho Chang, Gyeongsangbuk-do (KR); Hyeng-cheul Choi, Seoul (KR); Won-bin Hong, Gangnam-gu (KR); Byounggwan Kang, Seoul (KR); Choonkon Kim, Cheonan-si (KR); Youngno Youn, Pohang-si (KR)

(73) Assignees: CORNING INCORPORATED, Corning, NY (US); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 87 days.

(21) Appl. No.: 18/718,514

(22) PCT Filed: Dec. 8, 2022

(86) PCT No.: PCT/US2022/052200

§ 371 (c)(1),
(2) Date: Jun. 11, 2024

(87) PCT Pub. No.: WO2023/211503

PCT Pub. Date: Nov. 2, 2023

(65) Prior Publication Data

US 2025/0047007 A1 Feb. 6, 2025

Related U.S. Application Data

(60) Provisional application No. 63/290,680, filed on Dec. 17, 2021.

(51) Int. Cl.
*B32B 7/02* (2019.01)
*B32B 3/04* (2006.01)
(Continued)

(52) U.S. Cl.
CPC ................ *B32B 7/025* (2019.01); *B32B 3/04* (2013.01); *B32B 7/023* (2019.01); *B32B 17/061* (2013.01);
(Continued)

(58) Field of Classification Search
CPC ........... B32B 7/025; B32B 3/04; B32B 7/023; B32B 17/061; B32B 2250/02;
(Continued)

(56) References Cited

U.S. PATENT DOCUMENTS

| | | | | |
|---|---|---|---|---|
| 2003/0151556 A1* | 8/2003 | Cohen | H01Q 5/371 343/702 |
| 2004/0008145 A1* | 1/2004 | Killen | H01Q 15/02 343/753 |

(Continued)

FOREIGN PATENT DOCUMENTS

| | | |
|---|---|---|
| CN | 111565554 A | 8/2020 |
| CN | 111180898 B | 5/2021 |
| JP | 2021-044483 A | 3/2021 |

OTHER PUBLICATIONS

CN 111565554 A, English Machine Translation. (Year: 2020).*

(Continued)

*Primary Examiner* — Betelhem Shewareged
(74) *Attorney, Agent, or Firm* — Svetlana Z. Short

(57) ABSTRACT

One or more devices for absorbing electromagnetic radiation are disclosed. The one or more devices include a substrate comprising a glass material. The substrate also includes a first pattern of a metal layer formed on a first surface of the substrate and a second pattern of a metal layer formed on a
(Continued)

second surface of the substrate. The first pattern and the second pattern are different and features of the first pattern and the second pattern can be tunable to maximize optical transparency of the one or more devices and to maximize absorption of electromagnetic radiation having a target range of frequencies, such as one or more ranges of frequencies within the microwave portion of the electromagnetic spectrum.

12 Claims, 5 Drawing Sheets

(51) Int. Cl.
*B32B 7/023* (2019.01)
*B32B 7/025* (2019.01)
*B32B 17/06* (2006.01)

(52) U.S. Cl.
CPC ..... *B32B 2250/02* (2013.01); *B32B 2307/202* (2013.01); *B32B 2307/40* (2013.01); *B32B 2307/412* (2013.01); *B32B 2307/414* (2013.01); *B32B 2311/12* (2013.01); *B32B 2311/18* (2013.01); *B32B 2315/08* (2013.01)

(58) Field of Classification Search
CPC .......... B32B 2307/202; B32B 2307/40; B32B 2307/412; B32B 2307/414; B32B 2311/12; B32B 2311/18; B32B 2315/08
USPC .......................................................... 428/209
See application file for complete search history.

(56) References Cited

U.S. PATENT DOCUMENTS

| | | | | |
|---|---|---|---|---|
| 2005/0040141 | A1* | 2/2005 | Ly | B23H 7/08 219/69.1 |
| 2019/0386364 | A1* | 12/2019 | Liang | H01Q 15/0086 |
| 2021/0032926 | A1* | 2/2021 | Bertin-Mourot | G02B 5/282 |
| 2022/0255235 | A1 | 8/2022 | Hong et al. | |
| 2022/0320715 | A1 | 10/2022 | Hong et al. | |
| 2022/0330464 | A1 | 10/2022 | Nakanishi et al. | |
| 2025/0047007 | A1* | 2/2025 | Chang | H01Q 1/364 |

OTHER PUBLICATIONS

An_Optically_Transparent_Glass_Absorber_using_a_Multi-Fractal_Ring_Structure_for_Ka-band (Year: 2021).*

Jeong et al., "Optically Transparent Metamaterial Absorber Using Inkjet Printing Technology," Materials, vol. 12, No. 20, p. 3406, Oct. 2019.

Kiani et al., "Oblique Incidence Performance of a Novel Frequency Selective Surface Absorber," in IEEE Transactions on Antennas and Propagation, vol. 55, No. 10, pp. 2931-2934, Oct. 2007.

Lee et al., "Electrical Characterization of Highly Efficient, Optically Transparent Nanometers-thick Unit cells for Antenna-on-Display Applications," 2018 IEEE/MTT-S International Microwave Symposium—IMS, 2018, pp. 1043-1045.

Lu et al., "An optically transparent and ultra-wideband absorber based on multi-layer structure," 2019 Cross Strait Quad-Regional Radio Science and Wireless Technology Conference (CSQRWC), 2019, pp. 1-3.

Niaz et al., "Design of Broadband Electromagnetic Absorber Using Resistive Minkowski Loops" in Proceedings of 2013 10th International Bhurban Conference on Applied Sciences & Technology (IBCAST) IEEE, 5 pages.

Tian et al., "An broadband transparent metamaterial absorber using an ITO resistive-film," 2018 International Workshop on Antenna Technology (iWAT), 2018, pp. 1-3.

Tung et al., "High Optical Visibility and Shielding Effectiveness Metal Mesh Film for Microwave Oven Application," in IEEE Transactions on Electromagnetic Compatibility, vol. 62, No. 4, pp. 1076-1081.

Wu et al., "Flexible and Transparent W-Band Absorber Fabricated by EHD Printing Technology," in IEEE Antennas and Wireless Propagation Letters, vol. 19, No. 8, pp. 1345-1349, Aug. 2020.

Yoon et al., "Design of Transparent Electromagnetic Absorbing Structure using Metal Grid Mesh Printing," Journal of the Korea Institute of Military Science and Technology, vol. 19, No. 3, pp. 294-301, Jun. 2016.

* cited by examiner

OPTICALLY TRANSPARENT GLASS FREQUENCY ABSORBER

CROSS-REFERENCE TO RELATED APPLICATIONS

This application claims the benefit of priority under 35 U.S.C. § 371 of International Application No. PCT/US2022/052200, filed on Dec. 8, 2022, which claims the benefit of priority under 35 U.S.C. § 119 of U.S. Provisional Application No. 63/290,680 filed Dec. 17, 2021, the content of which is incorporated herein by reference in its entirety.

TECHNICAL FIELD

Implementations are directed to devices that absorb electromagnetic radiation. At least some implementations relate to techniques for designing patterns of metal layers disposed on a glass-containing substrate to absorb electromagnetic radiation.

BACKGROUND

Electromagnetic radiation absorbing devices can be used to minimize and suppress undesired and unexpected electromagnetic interference and wave propagation. Techniques for designing and fabricating devices that optimally absorb electromagnetic radiation may be desirable.

DETAILED DESCRIPTION

Figure 1:
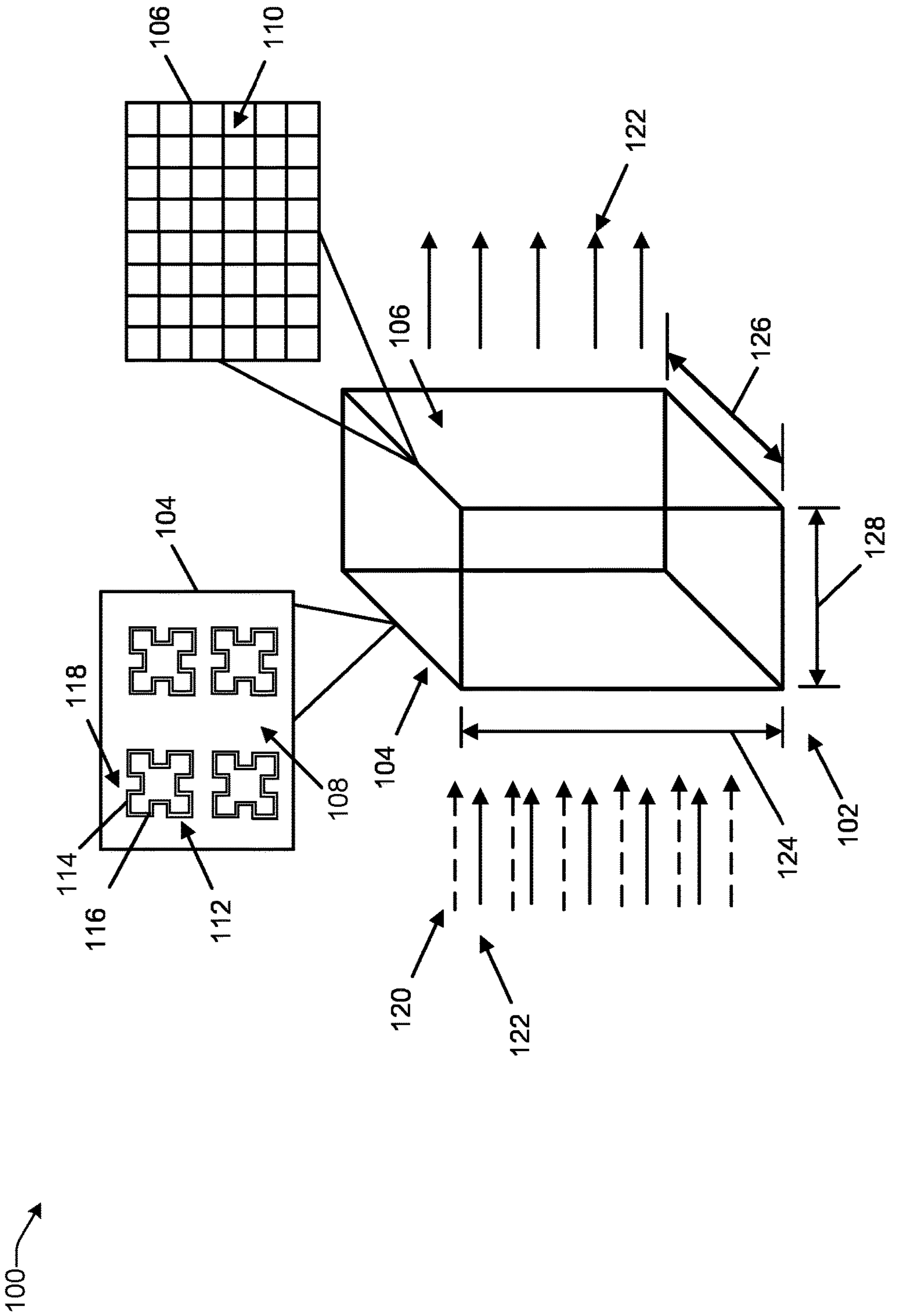
FIG. 1 illustrates an example device including a substrate that absorbs a range of wavelengths of electromagnetic radiation, in accordance with one or more implementations.

The following description and the drawings sufficiently illustrate specific implementations to enable those skilled in the art to practice them. Other implementations may incorporate structural, logical, electrical, process, and other changes. Portions and features of some implementations may be included in, or substituted for, those of other implementations. Implementations set forth in the claims encompass all available equivalents of those claims.

Various devices are currently used to absorb electromagnetic radiation having frequencies within the microwave portion of the electromagnetic spectrum and having wavelengths on the order of millimeters. At least some absorbers include opaque foam substrates. The foam substrates can be subject to degradation due to exposure based on temperature and humidity and due to mechanical erosion of the materials used to form the foam substrates. As a result, the performance of many existing electromagnetic radiation absorbers can degrade over time.

Additionally, some existing electromagnetic radiation absorbers can implement conductive transparent electrodes. In these scenarios, the electromagnetic radiation absorbers can include layers of films that include patterns formed by silver inks, indium tin oxide, and carbon nanowires. The electromagnetic radiation absorbers that include conductive transparent electrodes typically have line widths that are detrimental for high transparent applications and also have limited conductivities. Thus, the environments in which the electromagnetic radiation absorbers that utilize conductive transparent electrodes can be somewhat limited.

Implementations described herein include a single layer substrate having patterns formed on the surfaces of the substrate using materials that are more highly conductive than existing electromagnetic radiation absorbers, such as copper and titanium. The use of conductive materials, such as copper and titanium, in electromagnetic radiation absorbers can expand the number of applications for electromagnetic radiation absorption devices described herein. Additionally, line widths of the patterns formed on the substrate can be minimized and optical transparency can be maximized by implementing the techniques described herein. Further, the use of glass substrates and highly conductive materials can result in more durable devices for the absorption of electromagnetic radiation in relation to existing electromagnetic radiation absorbers.

Further, existing electromagnetic radiation absorbing devices typically do not absorb electromagnetic radiation within the substrate(s) by creating resonance with respect to incident electromagnetic radiation, but electromagnetic radiation incident on existing absorbers results in heat that is dissipated into the environment due to poor conductivity of the materials used in existing electromagnetic radiation absorbers. In contrast, devices described herein can be tuned to absorb electromagnetic radiation such that the electromagnetic radiation becomes trapped within the substrate and the amount of heat generated due to electromagnetic radiation incident on surfaces of the devices described herein is minimized. The electromagnetic radiation absorbers described herein are also highly tunable with respect to frequencies and the magnitude of ranges of frequencies absorbed by the devices by modifying various dimensions of the devices.

FIG. 1 illustrates an example device 100 including a substrate 102 that absorbs a range of wavelengths of electromagnetic radiation, in accordance with one or more implementations. The substrate 102 can include a first surface 104 and a second surface 106. The second surface 106 can be disposed opposite the first surface 104. In addition, the second surface 106 can be disposed at least substantially parallel with respect to the first surface 104. One or more patterns can be formed on the first surface 104 and the second surface 106 to cause electromagnetic radiation to be absorbed by the device 100. For example, a first pattern 108 can be disposed on the first surface 104 and a second pattern 110 can be disposed on the second surface 106. In various examples, features of the first pattern 108 and the second pattern 110 can have a number of configurations based on the range of wavelengths of electromagnetic radiation to be absorbed by the device 100. In one or more examples, the first pattern 108 can include a number of elements 112. Individual elements 112 can include one or more structures. In the illustrative example of FIG. 1, the individual elements 112 include an outer structure 114 and an inner structure 116. The dimensions of the inner structure 116 can be proportional to the dimensions of the outer structure 114. Additionally, the outer structure 114 and the inner structure 116 can include a notched region 118. Further, a gap can be present between the lines of the outer structure 114 and the inner structure 116. In various examples, the individual elements 112 can include no inner structures or a greater number of inner structures than the single inner structure 114 shown in FIG. 1. In various examples, the second pattern 110 formed on the second surface 106 of the substrate 102 can include a grid pattern.

In one or more examples, features of the structures 114, 116 can be configured with respect to target wavelengths of electromagnetic radiation to be absorbed by the device 100. To illustrate, a first configuration of the structures 114, 116 can be configured to cause electromagnetic radiation having a first range of target wavelengths to be absorbed by the device 100 and a second configuration of the structures 114, 116 can be configured to cause electromagnetic radiation having a second range of target wavelengths to be absorbed by the device 100. In one or more illustrative examples, at least one of dimensions of the structures 114, 116; the gap between the structures 114, 116; line widths of the structures 114, 116; dimensions of the notched regions 118; or number of the notched regions 118 can be tuned in order to cause the device 100 to absorb a target range of wavelengths. Further, by increasing the number of structures included in each element 112, a greater range of frequencies of electromagnetic radiation can be absorbed by the device 100. For example, the outer structure 114 combined with the inner structure 116 can cause the device 100 to absorb a greater range of frequencies of electromagnetic radiation than either the outer structure 114 or the inner structure 116 individually. In implementations where the individual elements 112 include more than one inner structure 116, the device 100 can absorb a greater range of frequencies of electromagnetic radiation than in instances where the outer structure 114 and the inner structure 116 are present.

In one or more examples, the first pattern 108 and the second pattern 110 can be configured to cause the device 100 to absorb electromagnetic radiation that corresponds to a portion of the electromagnetic spectrum that corresponds to microwaves. In one or more illustrative examples, the first pattern 108 and the second pattern 110 can be configured to cause the device 100 to absorb electromagnetic radiation having frequencies from 300 megahertz (MHz) to 300 gigahertz (GHz). In one or more additional illustrative examples, the first pattern 108 and the second pattern 110 can be configured to cause the device 100 to absorb electromagnetic radiation having frequencies from 1 GHz to 100 GHz or having wavelengths from 300 mm to 3 mm. In one or more further illustrative examples, the first pattern 108 and the second pattern 110 can be configured to cause the device 100 to absorb electromagnetic radiation having frequencies from 20 GHz to 30 GHz, from 25 GHz to 35 GHz, from 30 GHz to 40 GHz, from 35 GHz to 45 GHz, or from 40 GHz to 50 GHz. For example, the first pattern 108 and the second pattern 110 can be configured to absorb electromagnetic radiation having frequencies from 20 GHz to 25 GHz, from 26 GHz to 29 GHz, from 35 GHz to 38 GHz, from 37 GHz to 41 GHz, or from 45 GHz to 49 GHz.

The first pattern 108 and the second pattern 110 can be configured to cause the device 100 to absorb an amount of the electromagnetic radiation that is incident on at least one of the first surface 104 or the second surface 106. In one or more examples, the first pattern 108 and the second pattern 110 can be configured to cause an amount of first electromagnetic radiation 120 having a first range of frequencies that is incident on at least one of the first surface 104 or the second surface 106 to resonate and become trapped within the substrate 102. The first range of frequencies can correspond to one or more frequency ranges included in the microwave portion of the electromagnetic spectrum. In various examples, an amount of absorption of the first electromagnetic radiation 120 by the device 100 can at least 80%, at least 82%, at least 85%, at least 88%, at least 90%, at least 92%, at least 95%, at least 98%, at least 99%, or at least 99.5%.

In addition to causing the first electromagnetic radiation 120 having the first range of frequencies to be absorbed by the device 100, the first pattern 108 and the second pattern 110 can be configured to cause the device 100 to be optically transparent by enabling second electromagnetic radiation 122 having a second range of frequencies to pass through the substrate 102. For example, the first pattern 108 and the second pattern 110 can be configured to enable an amount of the second electromagnetic radiation 122 within the visible spectrum to pass through the substrate 102. To illustrate, the first pattern 108 and the second pattern 110 can be configured to enable an amount of the second electromagnetic radiation 122 having wavelengths from 380 nanometers (nm) to 750 nm to pass through the substrate 102. In one or more illustrative examples, the first pattern 108 and the second pattern 110 can be configured such that the device 100 can have an amount of transparency of at least 80%, at least 82%, at least 85%, at least 88%, at least 90%, at least 92%, at least 95%, at least 98%, at least 99%, at least 99.5%, or at least 99.9%. The amount of transparency can correspond to an amount of transmittance of electromagnetic radiation within the visible spectrum through the device 100. For example, an amount of transparency of 90% can correspond to transmittance of 90% of electromagnetic radiation within the visible spectrum through the device 100. In one or more examples, a density of elements 112 disposed on the first surface 104 can be configured such that individual elements 112 are separated from one another and such that the device 100 has a specified amount of transparency.

The substrate 102 can comprise one or more materials. In one or more examples, the substrate 102 can comprise one or more glass materials. In one or more additional examples, the substrate 102 can comprise one or more polymeric materials. In one or more further examples, the substrate 103 can comprise one or more glass-ceramic materials. In various examples, the substrate 102 can comprise a glass having an amount of silica and an amount of one or more additional components. As used herein, the term "silica" can refer to silicon dioxide ($SiO_2$). In one or more illustrative examples, the substrate 102 can comprise pure silica. In one or more additional illustrative examples, the substrate 102 can comprise fused silica. In one or more further illustrative examples, the substrate 102 can comprise one or more aluminum oxides. For example, the substrate 102 can comprise $Al_2O_3$. In still further illustrative examples, the substrate 102 can comprise boron trioxide ($B_2O_3$). In various illustrative examples, the substrate 102 can comprise one or more alkaline earth metals. To illustrate, the substrate 102 can comprise at least one of MgO, CaO, SrO, or BaO. In one or more implementations, the substrate 102 can comprise an alkaline earth boro-aluminosilicate glass.

In one or more implementations, the substrate 102 can comprise a glass having silica content that is greater than content of any other component of the glass. For example, the substrate 102 can comprise at least 50 mole % silica, at least 55 mole % silica, at least 60 mole % silica, at least 65 mole % silica, at least 70 mole % silica, at least 75 mole % silica, at least 80 mole % silica, at least 85 mole % silica by weight, at least 90 mole % silica, at least about 95 mole % silica, or at least about 99 mole % silica. In various examples, substantially all of the substrate 102 can be comprised of silica. In one or more illustrative examples, the substrate 102 can be comprised of pure silica. In one or more additional illustrative examples, the substrate 102 can be comprised of from about 50 mole % silica to about 99 mole % silica, from about 60 mole % to about 90 mole % silica, from about 75 mole % to about 95 mole % silica, from about 50 mole % silica to about 70 mole % silica, from about 60 mole % silica to about 80 mole % silica, or from about 80 mole % silica to about 95 mole % silica.

In scenarios where the substrate 102 comprises an aluminum oxide, the amount of aluminum oxide present in the substrate 102 can be from 5 mole % to 40 mole %, from 10 mole % to 30 mole %, from 20 mole % to 40 mole %, from 10 mole % to 20 mole %, from 20 mole % to 30 mole %, or from 25 mole % to 40 mole %. In implementations where the substrate 102 comprises boron trioxide, the amount of boron trioxide present in the substrate 102 can be from 5 mole % to 40 mole %, from 10 mole % to 30 mole %, from 20 mole % to 40 mole %, from 10 mole % to 20 mole %, from 20 mole % to 30 mole %, or from 25 mole % to 40 mole %. Additionally, in instances where the substrate 102 comprises one or more alkaline earth metals, the amount of an individual alkaline earth metal present in the substrate 102 can comprise from 0.05 mole % to 10 mole %, from 0.5 mole % to 10 mole %, from 2 mole % to 10 mole %, from 2 mole % to 5 mole %, from 6 mole % to 9 mole %, or from 0.05 mole % to 1 mole %. Mole % as used herein can refer to mole percent calculated on an oxide basis.

Further, the substrate 102 can have a dielectric constant no greater than 3.5, no greater than 3.3, no greater than 3.1, no greater than 3.0, no greater than 2.7, no greater than 2.5, no greater than 2.3, no greater than 2.1, no greater than 2.0, no greater than 1.7, or no greater than 1.5. In one or more illustrative examples, the substrate can have a dielectric constant from about 1.5 to about 3.5, from about 1.5 to about 2.5, from about 2.0 to about 3.0, or from about 2.5 to about 3.5. The dielectric constant can also be referred to herein as relative permittivity. The relative permittivity can be calculated as a ratio of the complex frequency dependent permittivity of a material in the relation to the vacuum permittivity.

The first pattern 108 and the second pattern 110 can be formed from materials that include one or more metals. In one or more examples, the first pattern 108 and the second pattern 110 can be formed materials that include at least one of copper, an alloy of copper, titanium, or an alloy of titanium. In one or more illustrative examples, the first pattern 108 and the second pattern 110 can include lines that comprise at least 80% copper by weight, at least 82% copper by weight, at least 85% copper by weight, at least 88% copper by weight, at least 90% copper by weight, at least 92% copper by weight, at least 95% copper by weight, at least 98% copper by weight, at least 99% copper by weight, or at least 99.5% copper by weight. In one or more illustrative examples, the first pattern 108 and the second pattern 110 can include lines that are comprised of substantially all copper.

In various examples, the first pattern 108 and the second pattern 110 can be formed from one or more metallic materials having an electrical conductivity at 20° C. of at least 40 MegaSiemens per meter (MS/m), at least 45 MS/m, at least 50 MS/m, at least 55 MS/m, at least 60 MS/m, at least 65 MS/m, or at least 70 MS/m. In one or more illustrative examples, the first pattern 108 and the second pattern 110 can be formed from one or more metallic materials having an electrical conductivity at 20° C. from 40 MS/m to 70 MS/m, from 45 MS/m to 65 MS/m, from 50 MS/m to 60 MS/m, or from 55 MS/m to 60 MS/m.

The device 100 can be used to block electromagnetic radiation having one or more specified ranges of frequencies. In various examples, the device 100 can be used to block electromagnetic radiation in implementations where an optically clear substrate is utilized. For example, the device 100 can include a window that blocks electromagnetic radiation having one or more ranges of frequencies. To illustrate, the device 100 can include a window that blocks communication signals incident on at least one of the first surface 104 or the second surface 106. The device 100 can also include a window that blocks electromagnetic radiation used in medical imaging technologies or that blocks electromagnetic radiation emitted during the operation of machinery. In one or more examples, a voltage can be applied to lines of the first pattern 108 and to lines of the second pattern 110. Applying a voltage to the lines of the first pattern 108 and to the lines of the second pattern 110 can cause a capacitance to be generated within the substrate 102 between the first pattern 108 and the second pattern 110. In one or more illustrative examples, applying a voltage to the lines of the first pattern 108 and to the lines of the second pattern 110 can cause electromagnetic radiation having a specified range of wavelengths that is incident on at least one of the first surface 104 or the second surface 106 to be absorbed by the device 100.

Additionally, although the implementations described with respect to the illustrative example of FIG. 1 are directed to absorption of electromagnetic radiation by creating resonance with respect to electromagnetic radiation incident on at least one of the first surface 104 or the second surface 106, in other implementations, at least one of the first pattern 108 or the second pattern 110 can be configured to cause reflection of electromagnetic radiation incident on at least one of the first surface 104 or the second surface 106, refraction of electromagnetic radiation incident on at least one of the first surface 104 or the second surface 106, or deflection of electromagnetic radiation incident on at least one of the first surface 104 or the second surface 106.

The substrate 102 can have dimensions that correspond to the application for which the device 100 is being used. For example, the substrate 102 can have dimensions from a few millimeters to several meters. In one or more examples, the substrate 102 can have a height 124, a length 126, and a thickness 128. The thickness 128 can correspond to a range of target frequencies to be absorbed by the device 100. In one or more examples, the thickness 128 can be determined by:

0.05*Lambda<=substrate thickness<=0.6*Lambda, where lambda is defined as the wavelength at the center of the target range of frequencies of electromagnetic radiation. In one or more illustrative examples, the thickness 128 can be from 5 mm to 40 mm, from 10 mm to 30 mm, from 10 mm to 20 mm, from 15 mm to 30 mm, from 20 mm to 30 mm, from 25 mm to 40 mm, or from 30 mm to 40 mm.

Figure 2:
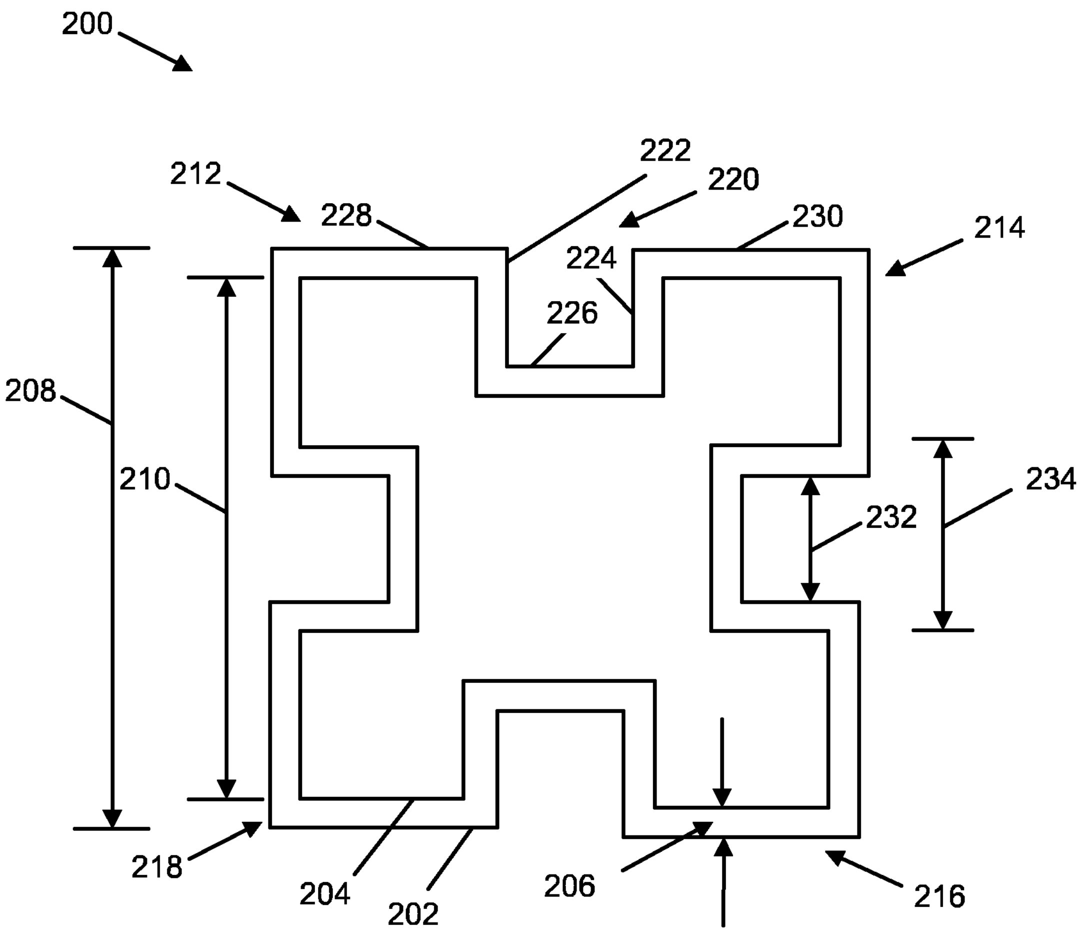
FIG. 2 illustrates an example element that comprises a number of structures disposed on a surface of a substrate with the number of structures having a design to cause an amount of electromagnetic radiation to be absorbed by the substrate, according to one or more implementations.

FIG. 2 illustrates an example element 200 that comprises a number of structures disposed on a surface of a substrate with the number of structures having a design to cause an amount of electromagnetic radiation to be absorbed by the substrate, according to one or more implementations. The element 200 can include a first structure 202 and a second structure 204 that is disposed within the first structure 202. The dimensions of the second structure 204 can be proportional to the dimensions of the first structure 204. For example, the dimensions of the second structure 204 can be reduced by a scaling factor with respect to the dimensions of the first structure 202. In one or more illustrative examples, the first structure 202 and the second structure 204 can comprise a Minkowski fractal structure.

The first structure 202 and the second structure 204 can comprise a number of lines of a metallic material. In one or more examples, the first structure 202 and the second structure 204 can be comprised of copper, copper and titanium, titanium, one or more alloys of copper, or one or more alloys of titanium. The width of the lines that comprise the first structure 202 and the second structure 204 can be no greater than 20 micrometers, no greater than 18 micrometers, no greater than 15 micrometers, no greater than 12 micrometers, no greater than 10 micrometers, no greater than 8 micrometers, no greater than 5 micrometers, or no greater than 2 micrometers. In one or more illustrative examples, the width of lines that comprise the first structure 202 and the second structure 204 can be from 2 micrometers to 20 micrometers, from 5 micrometers to 15 micrometers, from 8 micrometers to 12 micrometers, from 2 to 8 micrometers, or from 4 micrometers to 10 micrometers.

A gap 206 can be present between the first structure 202 and the second structure 204 such that lines of the first structure 202 do not contact lines of the second structure 204. The gap 206 can be at least 10 micrometers, at least 50 micrometers, at least 100 micrometers, at least 150 micrometers, at least 200 micrometers, at least 250 micrometers, at least 300 micrometers, at least 350 micrometers, at least 400 micrometers, at least 450 micrometers, or at least 500 micrometers. In one or more illustrative examples, the gap 206 can be from 10 micrometers to 500 micrometers, from 100 micrometers to 400 micrometers, from 200 micrometers to 300 micrometers, from 250 micrometers to 350 micrometers, from 150 micrometers to 250 micrometers, from 100 micrometers to 300 micrometers, or from 200 micrometers to 400 micrometers. In various examples, at least one of the gap 206 and the line widths of the first structure 202 and the second structure 204 can be tuned to adjust the transparency of a substrate on which the element 200 is present.

The first structure 202 and the second structure 204 can have a rectangular shape. In one or more illustrative examples, the first structure 202 and the second structure 204 can have a substantially square shape. For example, individual sides of the first structure 202 can have a first length 208 and individual sides of the second structure 204 can have a second length 210. In one or more example, the second length 210 can be a fraction of the first length 208. To illustrate, the second length 210 can be 0.95 times the first length 208, 0.90 times the first length 208, 0.85 times the first length 208, 0.8 times the first length 208, or 0.75 times the first length 208. In one or more illustrative examples, the first length 208 can be from 1 mm to 20 mm, from 1 mm to 10 mm, from 10 mm to 20 mm, from 5 mm to 15 mm, from 8 mm to 16 mm, from 10 mm to 15 mm, from 2 mm to 8 mm, from 3 mm to 7 mm, from 5 mm to 10 mm, or from 4 mm to 8 mm. In one or more additional illustrative examples, the second length 210 can be from 0.8 mm to 18 mm, from 10 mm to 18 mm, from 8 mm to 15 mm, from 6 mm to 12 mm, from 0.8 mm to 4 mm, from 1 mm to 5 mm, from 2 mm to 10 mm, from 4 mm to 7 mm, from 3 mm to 6 mm, from 5 mm to 9 mm, or from 3 mm to 8 mm.

The first structure 202 and the second structure 204 can include a number of sides. For example, the first structure 202 can include a first side 212, a second side 214, a third side 216, and a fourth side 218. The first side 212 can be disposed opposite the third side 216 and the second side 214 can be disposed opposite the fourth side 218. In addition, the first side 212 can be disposed at least substantially perpendicular with respect to the second side 214 and the fourth side 218 and the third side 212 can be disposed at least substantially perpendicular with the second side 214 and the fourth side 218. Although, the illustrative example of FIG. 2 shows that the sides 212, 214, 216, 218 are coupled to form substantially right angles, in one or more additional examples, the corners at the intersections of the sides 212, 214, 216, 218 can be rounded.

In various examples, the first structure 202 and the second structure 204 can include one or more notched regions. For example, at least a portion of the individual sides 212, 214, 216, 218 of the first structure 202 can include one or more notched regions. In the illustrative example of FIG. 2, the first side 212 can include an example notched region 220. The example notched region 220 can include a first sidewall 222 and a second sidewall 224 disposed opposite the first sidewall 222. In addition, the example notched region 220 can include a base 226 that is coupled to the first sidewall 222 and the second sidewall 224. The base 226 can be disposed at least substantially perpendicular with respect to the first sidewall 222 and the second sidewall 224. Additionally, the first sidewall 222 can be coupled to a first edge 228 of the first side 212 and the second sidewall 224 can be coupled to a second edge 230 of the first side 212. Although the illustrative example of FIG. 2 show that individual sides of the first structure 202 and the second structure 204 include a single notched region, in one or more additional implementations, the individual sides of the first structure 202 and the second structure 204 can have multiple notches, such as two notches per side, three notches per side, or four notches per side.

The notched regions of the first structure 202 can have a length 234 between the sidewalls of the notched regions of the first structure 202. In addition, the notched regions of the second structure 204 can have a length 234 between the sidewalls of the notched regions of the second structure 204. In one or more illustrative examples, the length 232 can be from 1 mm to 8 mm, from 2 mm to 6 mm, from 4 mm to 8 mm, from 1 mm to 5 mm, or from 3 mm to 6 mm. In one or more additional illustrative examples, the length 234 can be from 2 mm to 12 mm, from 4 mm to 10 mm, from 6 mm to 10 mm, from 2 mm to 8 mm, or from 8 mm to 12 mm.

In one or more examples, the length 232 and the length 234 can be configured based on an upper threshold of the resonant frequency and a lower threshold of the resonant frequency of the target range of the frequencies of electromagnetic radiation that are to be absorbed by a device that includes a number of elements 200. In one or more illustrative examples, the length 232 can correspond to the lower threshold of the resonant frequency of the target range of frequencies of electromagnetic radiation to be absorbed by a device comprising a number of the elements 200 and the length 234 can correspond to the upper threshold of the resonant frequency of the target range of frequencies of electromagnetic radiation to be absorbed by a device comprising a number of the elements 200. Additionally, the number of structures included in the element 200 can be tuned based on reflection loss that can take place when electromagnetic radiation is incident on a substrate on which a number of elements 200 are disposed. In various examples, the reflection loss can decrease as additional structures are added to the element 200. In one or more additional illustrative examples, the element can have from 2 to 4 structures, from 2 to 5 structures, or from 2 to 6 structures.

In one or more examples, the length 232, the length 234, and the number of structures included in the element 200 can determine a range of frequencies between an upper threshold and a target wavelength and a range of wavelengths between a lower threshold and the target wavelength. For example, the length 232, the length 234, and the number of structures included in the element 200 can be configured to produce a range of frequencies of electromagnetic radiation that is from 5% to 25% of a center value of a target range of frequencies, from 10% to 20% of a center value of a target range of frequencies, from 5% to 15% of a center value of a target range of frequencies, or from 15% to 25% of a center value of a target range of frequencies. In one or more illustrative examples, the center value of the target range of frequencies can be 28.6 GHz and the length 232, the length 234, and the number of structures included in the element 200 can be configured to produce a range of frequencies for absorption that is 20% of the value of 28.6 GHz. Continuing with this example, the lower threshold for the range of frequencies to be absorbed can be 25.74 GHz and the upper threshold for the range of frequencies to be absorbed can be 31.46 GHz.

Figure 3:
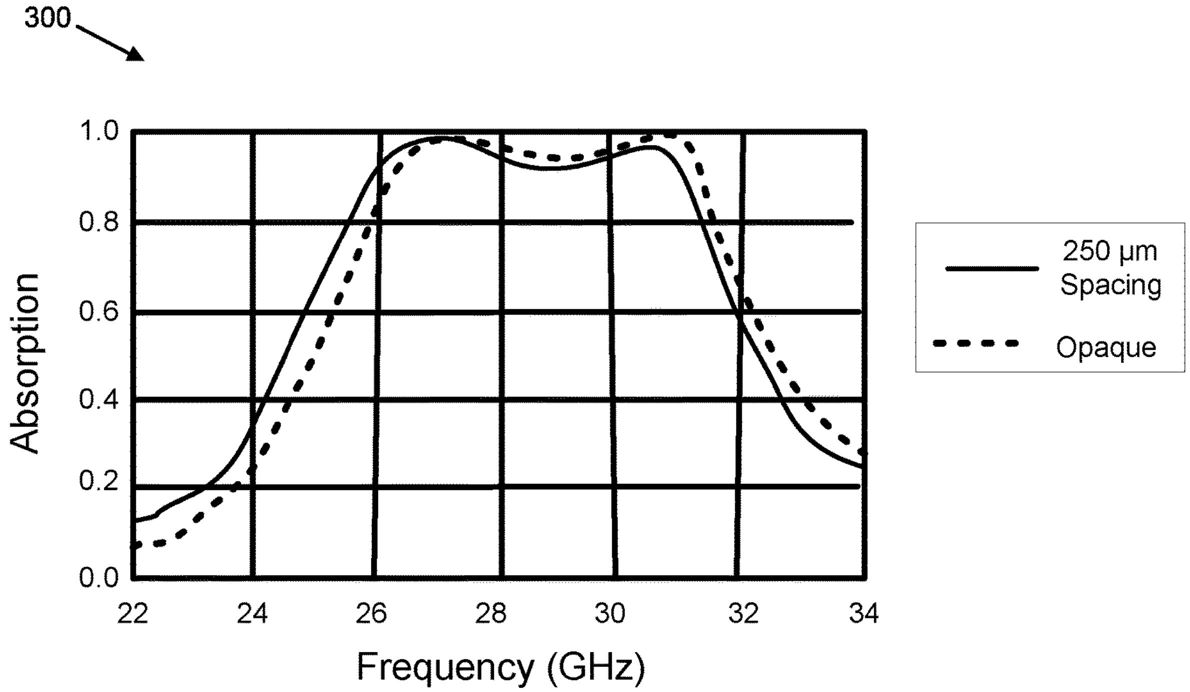
FIG. 3 illustrates a graphic indicating that devices configured according to implementations herein to absorb electromagnetic radiation (solid line) have a performance that is comparable to conventional electromagnetic radiation absorption devices (dotted line), in accordance with one or more implementations.

FIG. 3 illustrates a graphic 300 indicating that devices configured according to implementations herein to absorb electromagnetic radiation (solid line) have a performance that is at least comparable to conventional electromagnetic radiation absorption devices (dotted line), in accordance with one or more implementations.

Figure 4A:
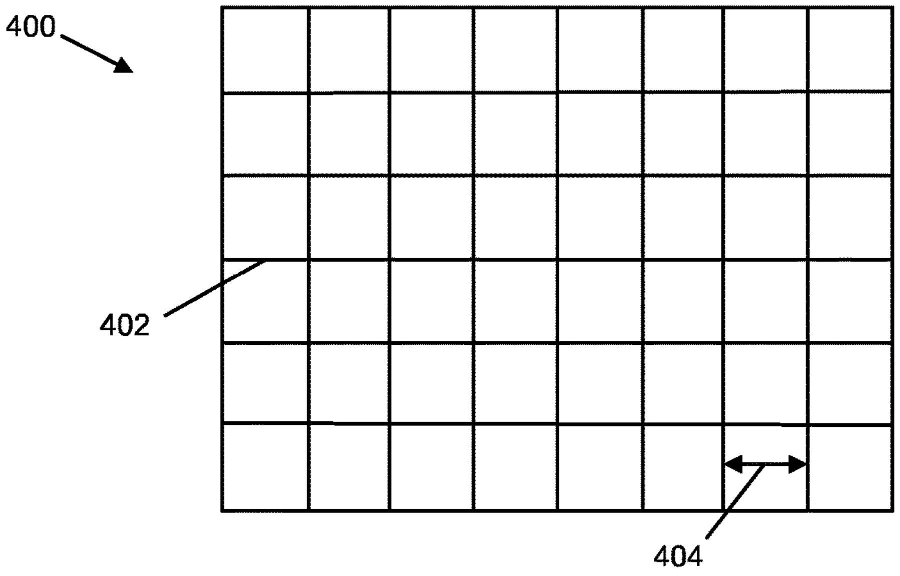
FIG. 4A illustrates a pattern of a surface of a substrate of a device that absorbs electromagnetic radiation, in accordance with one or more implementations.
Figure 4B:
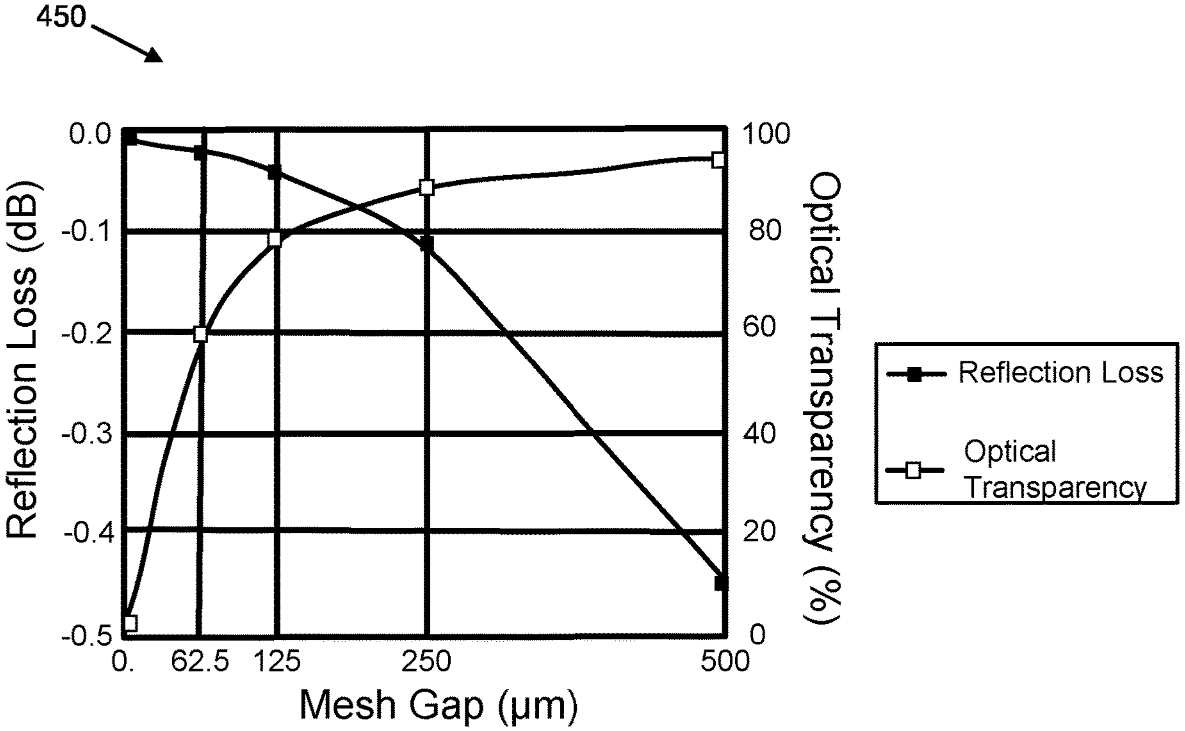
FIG. 4B illustrates a graphic indicating an impact on the size of the gap between lines of a pattern of a surface of a substrate that absorbs electromagnetic radiation on reflection loss and optical transparency, in accordance with one or more implementations.

FIG. 4A illustrates a pattern 400 of a surface of a substrate of a device that absorbs electromagnetic radiation, in accordance with one or more implementations. The pattern 400 can be disposed on a surface of a substrate, such as the second surface 106 of the substrate 102 of FIG. 1. The pattern 400 can include a number of lines 402. The number of lines 402 can be comprised of a metal. For example, the number of lines can be comprised of at least one of copper, titanium, an alloy of copper, or an alloy of titanium. A gap 404 can be present between the lines 402. In various examples, the gap 402 can be configured to impact an amount of reflection loss and an amount of optical transparency. To illustrate, FIG. 4B illustrates a graphic 450 indicating an impact on the size of the gap 404 between lines 402 of the pattern 400 of a surface of a substrate that absorbs electromagnetic radiation on reflection loss and optical transparency, in accordance with one or more implementations. The illustrative example of FIG. 4B shows that as the size of the gap 404 increases, the reflection loss increases and the optical transparency decreases while as the size of the gap 404 decreases, the reflection loss decreases and the optical transparency increases. Although the illustrative example of FIG. 4A shows the lines 402 arranged in one example of a grid pattern, in one or more implementations, the lines 402 can be arranged in another grid pattern. For example, in one or more additional implementations, the lines 402 can be arranged at 45° angles with respect to an edge of a substrate on which the pattern 400 is formed.

Figure 5:
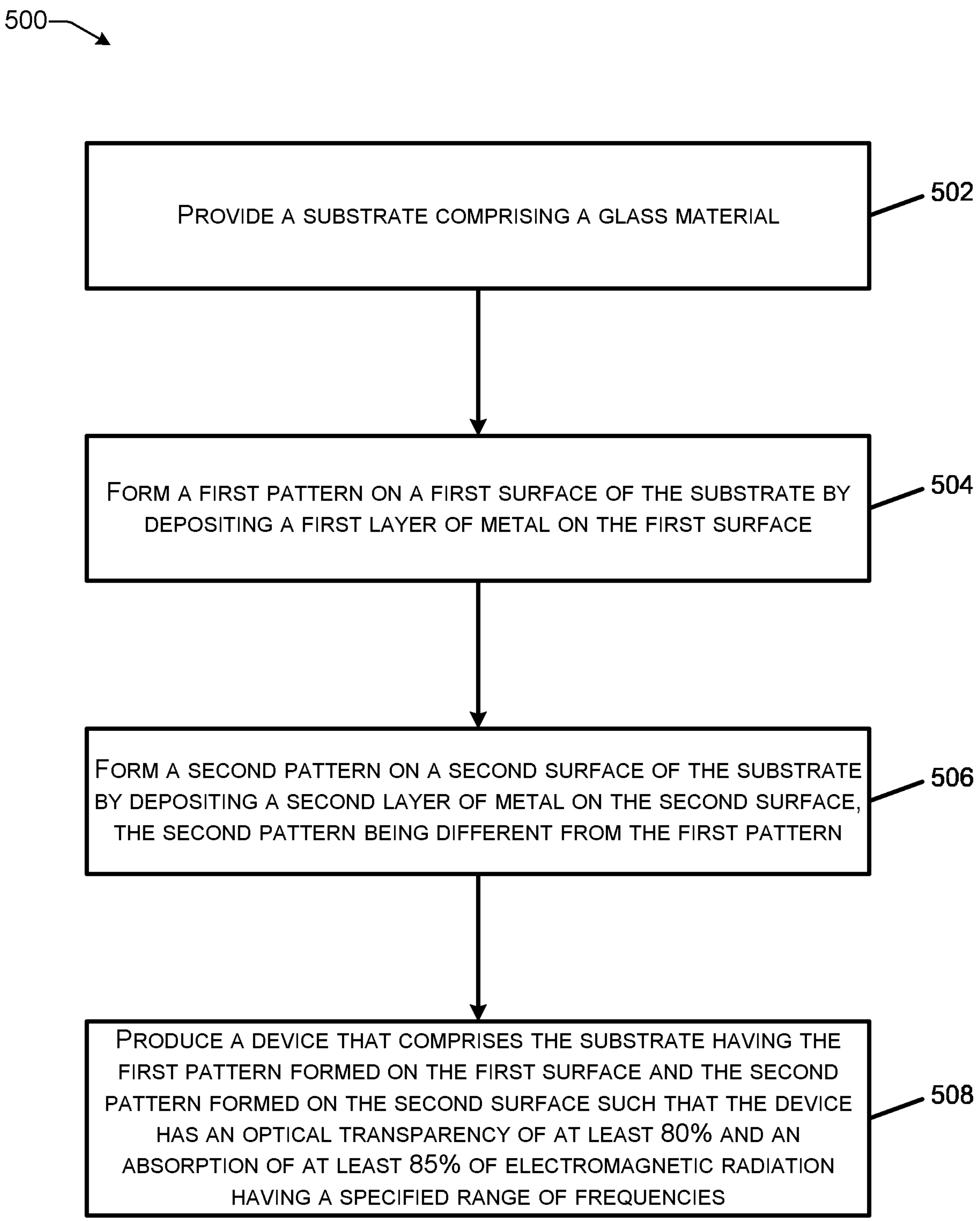
FIG. 5 illustrates a flowchart of an example process to produce a device that absorbs electromagnetic radiation, in accordance with one or more implementations.

FIG. 5 illustrates a flowchart of an example process 500 to produce a device that absorbs electromagnetic radiation, in accordance with one or more implementations. The process 500 can include, at 502, providing a substrate comprising a glass material. In one or more examples, the glass material of the substrate can comprise at least 50 mole % silica on an oxide basis. Further, the glass material of the substrate can have a dielectric constant no greater than 3.0.

In addition, the process 500 can include, at 504, forming a first pattern on a first surface of the substrate by depositing a first layer of metal on the first surface. In one or more examples, the first pattern can be formed on the first surface by performing a first sputtering process to deposit the first layer of metal onto the first surface. In one or more additional examples, the first pattern can be formed by performing a first electron beam deposition process to deposit the first layer of metal onto the first surface.

Further, the process 500 can include, at 506 forming a second pattern on a second surface of the substrate by depositing a second layer of metal on the second surface. In one or more examples, the second pattern can be formed on the second surface by performing a second sputtering process after the first sputtering process to deposit the second layer of metal onto the second surface. In one or more additional examples, the second pattern can be formed by performing a second electron beam deposition process after the first electron beam deposition process to deposit the second layer of metal onto the second surface.

The first pattern can include a number of elements. Individual elements of the number of elements can include a plurality of structures including an outer structure and an inner structure that is disposed within the outer structure. The outer structure can have a rectangular shape with individual sides of the outer structure including a notched region. In one or more examples, a notched region of a side of the outer structure can include a first sidewall and a second sidewall disposed opposite the first sidewall with the first sidewall and the second sidewall being connected by a base. In one or more additional examples, a notched region of a side of the inner structure can include a first additional sidewall and a second additional sidewall disposed opposite the first additional sidewall with the first additional sidewall and the second additional sidewall being connected by an additional base.

Additionally, the inner structure can have a rectangular shape with individual sides of the inner structure including an additional notched region. Further, dimensions of the inner structure can correspond to dimensions of the outer structure and being reduced by a scaling factor. In one or more examples, lines of the inner structure can be separated from lines of the outer structure by a gap from 5 micrometers to 25 micrometers In various examples, the range of frequencies of electromagnetic radiation absorbed by the device can correspond to the dimensions of the inner structure and the dimensions of the outer structure. For example, the amount of absorption of the range of frequencies of electromagnetic radiation can correspond to a dimension of notched regions of the outer structure and a dimension of notched regions of the inner structure in relation to a length of a side of the outer structure and a length of a side of the inner structure. To illustrate, the range of frequencies of electromagnetic radiation absorbed by the device can correspond to a length of the base of a notched region of the outer structure in relation to a length of a side of the outer structure and the range of frequencies of electromagnetic radiation absorbed by the device corresponds to an additional length of the additional base of a notched region of the inner structure in relation to an additional length of an additional side of the inner structure. In one or more illustrative examples, the outer structure and the inner structure can correspond to Minkowski fractal rings.

The second pattern can include a grid pattern having a number of lines. The lines can be separated by a gap. The gap can be from 25 micrometers to 500 micrometers, from 100 micrometers to 400 micrometers, from 200 micrometers to 300 micrometers, or from 150 micrometers to 250 micrometers. In one or more illustrative examples, the gap can be from 125 micrometers to 250 micrometers.

The metal used to form the first pattern and the second pattern can comprise at least one of copper or titanium. In addition, the metal used to form the first pattern and the second pattern can have an electrical conductivity at 20° C. from 40 MegaSiemens per meter (MS/m) to 60 MS/m. Further, the first pattern can be formed by a number of lines of the metal and the second pattern can be formed by a number of additional lines of the metal, where the number of lines and the number of additional lines have a width of no greater than 10 micrometers.

The process 500 can also include, at 508, producing a device that comprises the substrate having the first pattern formed on the first surface and the second pattern formed on the second surface such that the device has an optical transparency of at least 80% and an absorption of at least 85% of electromagnetic radiation having a range of frequencies included in a portion of the electromagnetic spectrum that corresponds to microwaves. In various examples, the electromagnetic radiation can be absorbed by the device in response to a voltage being applied to the first pattern and the second pattern. In one or more examples, applying the voltage to the first pattern and the second pattern can cause an amount of charge to be stored within the substrate. In various examples, the range of frequencies absorbed by the device can have a lower threshold frequency that corresponds to no greater than 10% of a value of a target frequency to be absorbed and an upper threshold frequency that corresponds to no greater than 10% of the value of the target frequency. In one or more illustrative examples, the target frequency can be from 20 gigahertz (GHz) to 45 GHz.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations are described as numbered examples (Example 1, 2, 3, etc.). These are provided as examples only and do not limit the technology disclosed herein.

Example 1. A device comprising: a substrate comprising a glass material and the substrate including a first surface and a second surface disposed opposite the first surface; a first layer of metal disposed on the first surface according to a first pattern that includes a number of elements, wherein: individual elements of the number of elements including a plurality of structures; the plurality of structures including an outer structure and an inner structure; the outer structure has a rectangular shape with individual sides of the outer structure including a notched region; the inner structure has a rectangular shape with individual sides of the inner structure including an additional notched region; and dimensions of the inner structure corresponding to dimensions of the outer structure and being reduced by a scaling factor; a second layer of the metal is disposed on the second surface according to a second pattern that is different from the first pattern, wherein the second pattern comprises a grid; and wherein the first pattern and the second pattern are configured to cause the device to have an optical transparency of at least 80% and to have an amount of absorption of a range of frequencies of electromagnetic radiation of at least 85%, and wherein the range of frequencies of electromagnetic radiation included in a portion of the electromagnetic spectrum that corresponds to microwaves.

In Example 2, the subject matter of Example 1 includes, wherein the range of frequencies of electromagnetic radiation absorbed by the device correspond to the dimensions of the inner structure and the dimensions of the outer structure.

In Example 3. the subject matter of Example 2 includes, wherein the amount of absorption of the range of frequencies of electromagnetic radiation correspond to a dimension of notched regions of the outer structure and a dimension of notched regions of the inner structure in relation to a length of a side of the outer structure and a length of a side of the inner structure.

In Example 4. the subject matter of Examples 1-3 includes, wherein the outer structure and the inner structure correspond to Minkowski fractal rings.

In Example 5, the subject matter of Examples 104 includes, wherein the metal has an electrical conductivity at 20° C. from 40 MegaSiemens per meter (MS/m) to 60 MS/m.

In Example 6, the subject matter of Example 5 includes wherein the metal comprises at least one of copper or titanium.

In Example 7, the subject matter of Examples 1-6 includes, wherein the range of frequencies absorbed by the device has a lower threshold frequency that corresponds to no greater than 10% of a value of a target frequency to be absorbed and an upper threshold frequency that corresponds to no greater than 10% of the value of the target frequency.

In Example 8, the subject matter of Example 7 includes, wherein the target frequency is from 20 gigahertz (GHz) to 45 GHz.

In Example 9, the subject matter of Examples 1-8 includes, wherein: the first pattern is formed by a number of lines of the metal and the second pattern is formed by a number of additional lines of the metal; and the number of lines and the number of additional lines have a width of no greater than 10 micrometers.

In Example 10, the subject matter of Examples 1-9 includes, wherein: a notched region of a side of the outer structure includes a first sidewall and a second sidewall disposed opposite the first sidewall; the first sidewall and the second sidewall are connected by a base; and the range of frequencies of electromagnetic radiation absorbed by the device corresponds to a length of the base in relation to a length of a side of the outer structure.

In Example 11, the subject matter of Example 10 includes, wherein: a notched region of a side of the inner structure includes a first additional sidewall and a second additional sidewall disposed opposite the first additional sidewall; the first additional sidewall and the second additional sidewall are connected by an additional base; and the range of frequencies of electromagnetic radiation absorbed by the device corresponds to an additional length of the additional base in relation to an additional length of an additional side of the inner structure.

In Example 12, the subject matter of Examples 1-11 includes, wherein the grid of the second pattern comprises a number of lines having a gap between the lines from 125 micrometers to 250 micrometers.

In Example 13, the subject matter of Examples 1-12 includes, wherein the glass material of the substrate comprises at least 50 mole % silica on an oxide basis.

In Example 14, the subject matter of Examples 1-13 includes, wherein the glass material of the substrate has a dielectric constant no greater than 3.0

In Example 15, the subject matter of Examples 1-14 includes, wherein lines of the inner structure are separated from lines of the outer structure by a gap from 5 micrometers to 25 micrometers.

Example 16. A process comprising: providing a substrate comprising a glass material; forming a first pattern on a first surface of the substrate by depositing a first layer of metal on the first surface; forming a second pattern on a second surface of the substrate by depositing a second layer of the metal on the second surface, the second pattern being different from the first pattern; and producing a device that comprises the substrate having the first pattern formed on the first surface and the second pattern formed on the second surface such that the device has an optical transparency of at least 80% and an absorption of at least 85% of electromagnetic radiation having a range of frequencies included in a portion of the electromagnetic spectrum that corresponds to microwaves.

In Example 17, the subject matter of Example 16 includes, applying a voltage to the first pattern and the second pattern to cause the device to absorb electromagnetic radiation having the specified range of frequencies.

In Example 18, the subject matter of Example 17 includes, wherein applying the voltage to the first pattern and the second pattern causes an amount of charge to be stored within the substrate.

In Example 19, the subject matter of Examples 16-18 includes, wherein: the first pattern is formed on the first surface by performing a first sputtering process to deposit the first layer of metal onto the first surface; and the second pattern is formed on the second surface by performing a second sputtering process to deposit the second layer of metal onto the second surface.

In Example 20, the subject matter of Examples 16-18 includes, wherein: the first pattern is formed on the first surface by performing a first electron beam process to deposit the first layer of metal onto the first surface; and the second pattern is formed on the second surface by performing a second electron beam process to deposit the second layer of metal onto the second surface.

Although one or more implementations have been described with reference to specific example implementations, it will be evident that various modifications and changes may be made to these implementations without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single implementation for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separate implementations.

What is claimed is:

1. A device comprising:

a substrate comprising a glass material, the glass material having a dielectric constant no greater than 3.0, and the substrate including a first surface and a second surface disposed opposite the first surface;

a first layer of metal disposed on the first surface according to a first pattern that includes a number of elements, wherein:

individual elements of the number of elements including a plurality of structures;

the plurality of structures include an outer structure and an inner structure disposed within the outer structure;

the outer structure has a rectangular shape with individual sides of the outer structure each including a notched region, wherein the notched region includes a first sidewall, a second sidewall disposed opposite the first sidewall, and a base connecting the first sidewall and the second sidewall, the base being disposed substantially perpendicular to the first sidewall and the second sidewall;

the inner structure has a rectangular shape with individual sides of the inner structure including an additional notched region having a first additional sidewall, a second additional sidewall disposed opposite the first additional sidewall, and an additional base connecting the first additional sidewall and the second additional sidewall;

dimensions of the inner structure corresponding to dimensions of the outer structure and being reduced by a scaling factor; and a range of frequencies of electromagnetic radiation absorbed by the device corresponds to a length of the base of the notched region in relation to a length of a side of the outer structure and to an additional length of the additional base in relation to an additional length of a side of the inner structure;

a second layer of the metal is disposed on the second surface according to a second pattern that is different from the first pattern, wherein the second pattern comprises a grid; and lines of the first pattern and the second pattern have a width of no greater than 10 micrometers, wherein the first pattern and the second pattern are configured to cause the device to have an optical transparency of at least 80% and to have an amount of absorption of a range of frequencies of electromagnetic radiation having a target range of frequencies from 20 GHz to 45 GHz of at least 85% by causing the electromagnetic radiation to resonate and become trapped within the substrate.

2. The device of claim 1, wherein the range of frequencies of electromagnetic radiation absorbed by the device corresponds to the dimensions of the inner structure and the dimensions of the outer structure.

3. The device of claim 2, wherein the amount of absorption of the range of frequencies of electromagnetic radiation correspond to a dimension of notched regions of the outer structure and a dimension of notched regions of the inner structure in relation to a length of a side of the outer structure and a length of a side of the inner structure.

4. The device of claim 1, wherein the outer structure and the inner structure correspond to Minkowski fractal rings in which the inner structure is a scaled iteration of the outer structure sharing a common center, and a gap between lines of the inner structure and lines of the outer structure is from 5 micrometers to 25 micrometers.

5. The device of claim 1, wherein the metal has an electrical conductivity at 20° C. from 40 MegaSiemens per meter (MS/m) to 60 MS/m.

6. The device of claim 5, wherein the metal comprises at least one of copper or titanium.

7. The device of claim 1, wherein the range of frequencies absorbed by the device has a lower threshold frequency that corresponds to no greater than 10% of a value of a target frequency to be absorbed and an upper threshold frequency that corresponds to no greater than 10% of the value of the target frequency.

8. The device of claim 7, wherein the target frequency is from 20 gigahertz (GHz) to 45 GHz.

9. The device of claim 1, wherein:

the first pattern is formed by a number of lines of the metal and the second pattern is formed by a number of additional lines of the metal; and the number of lines and the number of additional lines have a width of no greater than 10 micrometers.

10. The device of claim 1, wherein the grid of the second pattern comprises a number of lines having a gap between the lines from 125 micrometers to 250 micrometers, the gap being configured to balance optical transparency and reflection loss of the device.

11. The device of claim 1, wherein the glass material of the substrate comprises at least 50 mole % silica on an oxide basis.

12. The device of claim 1, wherein lines of the inner structure are separated from lines of the outer structure by a gap from 5 micrometers to 25 micrometers.

* * * * *